United States Patent [19]

Munk et al.

[11] Patent Number: 4,552,797
[45] Date of Patent: Nov. 12, 1985

[54] PLATE-SHAPED COVERING PROFILE AND METHOD FOR MANUFACTURING THE SAME

[75] Inventors: Edmund Munk, Oberstenfeld; Martin Dietz, Mainhardt, both of Fed. Rep. of Germany

[73] Assignees: Furnier-U.Sperrholzwerk, Oberstenfeld; J. F. Werz, Jr. KG, Werzalit-Pressholzwerk, Ludwingsburg, both of Fed. Rep. of Germany

[21] Appl. No.: 479,702

[22] Filed: Mar. 28, 1983

[51] Int. Cl.$^4$ .............................................. B32B 3/30
[52] U.S. Cl. ................................ 428/167; 52/309.13; 428/174; 428/192
[58] Field of Search ............... 428/156, 167, 174, 290, 428/292, 192; 52/309.13; 264/118, 119

[56] References Cited
U.S. PATENT DOCUMENTS 3,583,123  6/1971  Holmgren et al. .................. 428/167
3,959,572  5/1976  McCartan et al. .................. 428/290

Primary Examiner—Paul J. Thibodeau
Attorney, Agent, or Firm—Michael J. Striker

[57] ABSTRACT

A covering profile for structures is manufactured by pressing a non-swelling mixture of fibrous materials and thermosetting binding agent. The covering profile has an elongated body whose upper surface is provided with grooves extending parallel to the elongation of the body and being regularly spaced from each other. Associated to each groove in the upper surface are two countergrooves in the rear surface of the body. The method for manufacturing a so-shaped covering profile includes the prepressing in a prepressing tool having plane surfaces while the grooves and countergrooves are produced in the hot pressing.

3 Claims, 4 Drawing Figures

PLATE-SHAPED COVERING PROFILE AND METHOD FOR MANUFACTURING THE SAME

BACKGROUND OF THE INVENTION

The invention relates to a plate-shaped covering profile which is pressed from a non-risable mixture of fibrous material and a thermosetting binding agent, and provided for covering buildings.

In general, such covering profiles have a body whose upper surface is provided with grooves and that at least one end section of the body is provided with a segment which is arranged offset to the remaining portion of the body. The German Offenlegungsschrift No. 25 30 263 discloses the manufacture of a covering profile for buildings which is pressed out of a mixture composed of fibrous material and a thermosetting binding agent. The so produced construction profile is used as wall and ceiling covering.

Covering profiles are usually used in certain standard sizes, as for example having the size of 20×125 cm. The surface of the covering profile which is exposed to the outside is subdivided by a plurality of grooves regularly spaced from each other because of technical reasons and also in order to improve the external appearance. Such covering profiles are applied corresponding to the respective pattern. In case the pattern is covering a large area, a high amount of material is required during the application because the amount of waste is considerable.

Usually, the covering profiles pressed out of a non-swelling mixture of fibrous material and thermosetting binding agent are not produced of such a length which is suitable for the application but of a size multiple of the size of the covering profile ready for application.

The non-swelling mixture is usually composed of lignocellulose-containing fiber material, as comminuted and dried wood chips, bagasse-fibers and the like, which are mixed with a thermosetting synthetic resin, as melamine-ureaformaldehyde resin or phenolformaldehyde resin. Instead of the comminuted and dried wood or bagasse fibers, it is also possible to use fibers of other materials, such as glass fibers, stone wool, or other mineral fibers individually or in any mixture thereof to which preferably organic binding agents are added.

In order to produce a covering profile, the mixture is subjected to a cold pressing for obtaining a prepress article which is subsequently subjected to a hot press and if necessary simultaneously be covered by a decorative cover layer. Within the hot press, the prepress article is shaped to the covering profile which is cured and if necessary simultaneously is completely surrounded by a protective and/or decorative cover layer.

This method of manufacture, however, has the disadvantage that the covering profiles which are provided with transverse grooves regularly spaced on the exposed surface thereof become distorted or warped. Moreover, the manufacture of such covering profiles is additionally impaired because the prepress article is swelling by a certain volume after its removal from the prepress. The quantity of this increase in volume is not constant, but depends on a number of parameters, for example the shape of the fiber material, the fraction of binding agent in the non-swelling mixture, the moisture degree of this mixture, the applied manner for filling the mold with the mixture, the period of the prepressing step, and the interim period between prepressing and hot pressing.

SUMMARY OF THE INVENTION

It is thus a general object of the invention to overcome the difficulties of the prior art.

More particularly, it is an object of the invention to provide a method for manufacturing cover profiles whose exposed surface is provided with transversely extending grooves regularly spaced from each other, wherein the finished covering profile has an improved quality and especially has a plane surface.

In keeping with these objects, and with others which will become apparent hereafter, one feature of the invention resides, briefly stated, in a covering profile including an elongated body having an upper surface provided with at least one groove extending transversely to the elongation of the body and a rear surface provided with at least two countergrooves each extending parallel to and located at a different respective side of the upper groove when projecting the latter on the rear surface of the body.

According to a further feature of the invention, the segment elongated body has a main portion and two end sections spaced from each other in longitudinal direction, at least one of said end sections being provided with a segment part arranged offset relative to the main portion of said body in longitudinal direction being provided with an upper recess in the upper surface extending transversely to the elongation of the body, and with a rear counterrecess parallel to the upper recess.

Yet another feature of the invention resides in that the prepressing is performed in a prepress tool having plane surfaces and that the grooves and countergrooves, as well as the recess and counterrecess, are produced in the hot press.

Through the provision of such a method for producing covering profiles pressed from a non-swelling mixture, no bending or distorting occurs, but the covering profiles have plane surfaces. A further advantage of the present invention resides in the fact that the manufacture of such covering profiles can be performed in a manner known per se by producing a prepress article which is subsequently subjected to hot pressing.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
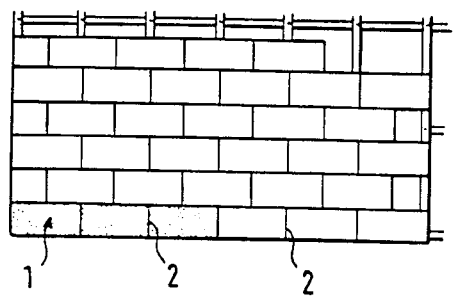
FIG. 1 shows a section of a wall covered with plate-shaped covering profiles.
Figure 2:
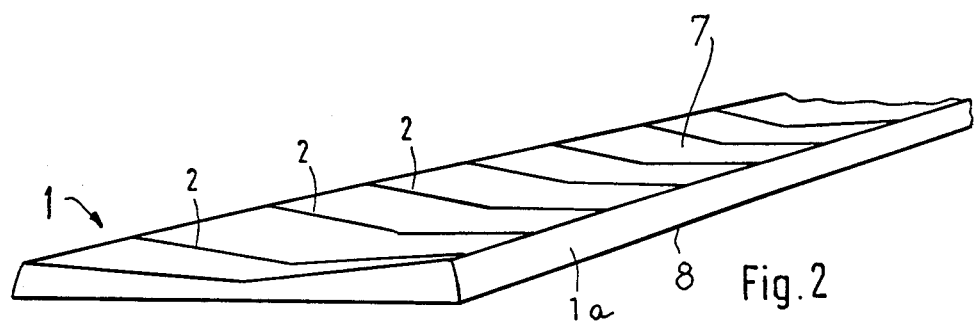
FIG. 2 shows a perspective view of one plate-shaped covering profiles having a plurality of transverse grooves.

Referring firstly to FIG. 1, there is illustrated a section of a wall which is covered by a plurality of covering profiles 1 each of plate shape. The covering profiles 1 which have standard sizes like for example 20×125 cm include an elongated body member 1a which has a surface 7 exposed to the outside and a rear surface 8, as shown e.g. in FIG. 3. The surface 7 is provided with a plurality of grooves 2 which extend transversely to the elongation of the body 1a as can be seen from FIG. 2.

The covering profiles 1, which are pressed from a non-swelling mixture, are usually not finished as individual pieces but preferably a molded piece is produced which consists of a sequence of covering profiles, as for example five. This, however, does not mean that the covering profiles cannot be individually produced.

Figure 3:
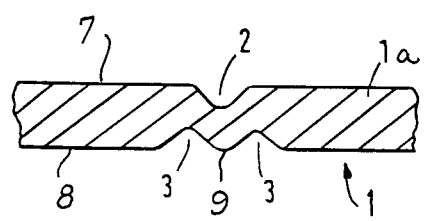
FIG. 3 shows a longitudinal section of the plate-shaped covering profile according to FIG. 2.

As can be seen from FIG. 3, the rear surface 8 of the body 1a is provided with two countergrooves 3 which are parallel to the groove located on the front surface and arranged symmetrically on different sides of the groove 2, so that a bulge 9 is obtained between the countergrooves 3 which bulge 9 corresponds to the contour of the groove 2 in the exposed surface 7.

Figure 4:
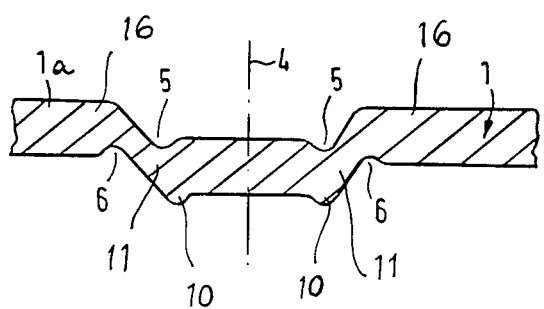
FIG. 4 shows a longitudinal section of two covering profiles illustrating respective end sections.

In FIG. 4, there is shown the respective body members 1a of two adjacent covering profiles 1 each of the bodies 1a having an end section 1b. The two covering profiles are pressed in the mold in one part and are separated along line 4 at a later stage. Each end section 1b is integrally provided with a segment part 11 which is arranged offset relative to the main portion of the body 1a in longitudinal direction and is provided with a groove 5 on the exposed surface 7. Parallel thereto, a countergroove 6 is arranged on the rear surface 8 of the end section 1b. Corresponding essentially to the contour of the groove 5 in the exposed surface of the body 1a, a bulge 10 is provided in the rear surface of the segment part 11. In FIG. 4 there is only shown one end section of each covering profile 1 and it may be noted that the other end of the covering profile 1, which is not shown in FIG. 4, is developed in corresponding manner, so that both end sections can overlap.

Through the provision of countergrooves and counterrecesses, the finished covering profiles have desired plane surfaces and do not show any distortion or bending as experienced with covering profiles known to date.

It will be understood that each of the elements described above, or two or more together, may also find a useful application in other types of plate-shaped covering profiles and methods for producing the same differing from the types described above.

While the invention has been illustrated and described as embodied in a plate-shaped covering profile and a method for manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plate-shaped covering profile for covering structures, said covering profile being pressed from a non-swelling mixture of fibrous material and a thermosetting binding agent, the covering profile comprising a one-piece elongated body having an upper surface provided with at least one upper groove extending transversely to the elongation of said body and having a predetermined contour, and a rear surface provided with at least two countergrooves each extending parallel to and located at a different respective side of said upper groove when projecting said upper groove on the rear surface of said body so as to form on said rear surface a bulge corresponding to the contour of said upper groove, so that said upper surface with at least one said upper groove and said lower surface with at least two said countergrooves have different shapes.

2. A covering profile as defined in claim 1, wherein said elongated body has a main portion and two end sections spaced from each other in longitudinal direction, at least one of said end sections being provided with a segment part arranged offset relative to the main portion of said body in longitudinal direction, said segment part being provided with an upper recess in the upper surface and extending transversely to the elongation of said body and with a rear counterrecess in the rear surface, said rear counterrecess extending parallel to said upper recess.

3. A covering profile as defined in claim 1, wherein said upper surface is provided with at least one further upper groove extending at a distance from said first-mentioned upper groove transversely to the elongation of said body and having a predetermined contour, and said rear surface is provided with at least two further countergrooves extending at a distance from said first-mentioned two countergrooves each parallel to and located at a different respective side of said further upper groove when projecting said further upper groove on the rear surface of said body so as to form on said rear surface a bulge corresponding to the contour of said further upper groove, so that said upper surface with at least two said upper grooves and said lower surface with at least four said countergrooves have different shapes.

* * * * *